(12) United States Patent
Wang

(10) Patent No.: US 9,095,242 B2
(45) Date of Patent: Aug. 4, 2015

(54) TRANSMISSION MODULE OF A TOILET SEAT SANITATION PAPER DISPENSER

(71) Applicant: Tsung-Chieh Wang, Kaohsiung (TW)

(72) Inventor: Tsung-Chieh Wang, Kaohsiung (TW)

( * ) Notice: Subject to any disclaimer, the term of this patent is extended or adjusted under 35 U.S.C. 154(b) by 280 days.

(21) Appl. No.: 13/711,710

(22) Filed: Dec. 12, 2012

(65) Prior Publication Data
US 2013/0239720 A1 Sep. 19, 2013

(30) Foreign Application Priority Data

Mar. 14, 2012 (TW) .............................. 101108700 A

(51) Int. Cl.
| | |
|---|---|
| *A47K 13/14* | (2006.01) |
| *A47K 13/22* | (2006.01) |
| *F16H 1/02* | (2006.01) |
| *F16H 1/20* | (2006.01) |
| *F16H 57/021* | (2012.01) |

(52) U.S. Cl.
CPC .............. *A47K 13/225* (2013.01); *A47K 13/145* (2013.01); *F16H 1/02* (2013.01); *F16H 1/20* (2013.01); *F16H 57/021* (2013.01); *Y10T 74/19642* (2015.01)

(58) Field of Classification Search
CPC ......... A47K 3/165; A47K 3/225; A47K 3/20; A47K 3/22; A47K 3/145
USPC .............. 4/243.1, 243.2, 243.3, 211.1, 244.2, 4/246.1, 246.3; 74/606 R, 412 R, 413, 74/421 R
See application file for complete search history.

(56) References Cited

U.S. PATENT DOCUMENTS

| | | | | | |
|---|---|---|---|---|---|
| 1,363,085 | A | * | 12/1920 | Carlson ........................... | 4/243.3 |
| 4,137,789 | A | * | 2/1979 | Herleth ........................... | 74/404 |
| 4,582,171 | A | * | 4/1986 | Jezierski ......................... | 185/39 |
| 4,769,859 | A | * | 9/1988 | Bobak ............................ | 4/243.3 |
| 5,203,036 | A | * | 4/1993 | Juushi ............................ | 4/243.3 |
| 5,826,679 | A | * | 10/1998 | Chern ............................ | 182/238 |
| 5,970,822 | A | * | 10/1999 | Jung et al. ..................... | 74/810.1 |
| 6,848,123 | B2 | * | 2/2005 | Lim ............................... | 4/243.2 |
| 8,827,030 | B1 | * | 9/2014 | Strenge ......................... | 180/374 |
| 2009/0293183 | A1 | * | 12/2009 | Wei ............................... | 4/243.3 |
| 2012/0017361 | A1 | | 1/2012 | Lankenau | |

FOREIGN PATENT DOCUMENTS

TW M317247 U 8/2007

OTHER PUBLICATIONS

Machine Translation for TWM317247.*

* cited by examiner

*Primary Examiner* — Lauren Crane
*Assistant Examiner* — Erin Deery
(74) *Attorney, Agent, or Firm* — Alan D. Kamrath; Kamrath IP Lawfirm, P.A.

(57) ABSTRACT

A transmission module of a toilet seat sanitation paper dispenser includes a housing, a gear assembly and a lever assembly. The housing has a plurality of sets of positioning holes, a set of first central holes and a set of second central holes. The gear assembly has a front gear, an intermediate gear unit and a rear gear unit. The front gear and the rear gear unit are coupled to the plurality of sets of positioning holes. The intermediate gear unit is capable of being optionally coupled with the set of first or second central holes. The front gear is engaged with the intermediate gear unit, and the intermediate gear unit is engaged with the rear gear unit. The lever assembly is connected to the front gear to drive the front gear to rotate.

6 Claims, 7 Drawing Sheets

TRANSMISSION MODULE OF A TOILET SEAT SANITATION PAPER DISPENSER

BACKGROUND OF THE INVENTION

1. Field of the Invention

The present invention generally relates to a transmission module of a toilet seat sanitation paper dispenser and, more particularly, to a transmission module that controls the toilet seat sanitation paper dispenser to dispense the seat paper on the toilet seat and to collect the used seat paper for replacement of the used seat paper.

2. Description of the Related Art

Referring to FIG. 1, Taiwan Patent No. M317247 discloses a conventional toilet seat sanitation paper dispenser 9 having a manual base 91, a toilet seat 92, a seat paper cartridge 93, a transmission module 94 and a cover 95. The seat paper cartridge 93 provides seat paper for the toilet seat 92.

The manual base 91 includes two pairs of standing plates 911. A counterclockwise-rotating roller dispenser 912 is mounted on one pair of the standing plates 911, and a clockwise-rotating roller collector 913 is mounted on the other pair of the standing plates 911. The manual base 91 further includes two opposing cutting blades 914 arranged in positions corresponding to the roller collector 913. The toilet seat 92 is connected to one edge of the manual base 91. The seat paper from the seat paper cartridge 93 completely covers the surface of the toilet seat 92. The paper of the seat paper cartridge 93 is connected between the roller dispenser 912 and the roller collector 913. The transmission module 94 includes a lever 941 and a gear portion 942. The lever 941 is connected to the roller collector 913 via the gear portion 942. The cover 95 is coupled with the manual base 91 to cover the standing plates 911, the roller dispenser 912, the roller collector 913 and the gear portion 942 for improved aesthetic integrity of the toilet seat sanitation paper dispenser 9.

In this structure, when a user operates the lever 941 in a predetermined direction (such as a clockwise direction), the lever 941 drives the gear portion 942 which, in turn, drives the roller collector 913 to rotate. As a result, the rotating roller collector 913 is able to roll up the paper of the seat paper cartridge 93 that covers the surface of the toilet seat 92. At this time, the two cutting blades 914 cut the paper of the seat paper cartridge 93. When the roller collector 913 rotates to collect the paper of the seat paper cartridge 93, the paper of the seat paper cartridge 93 will pull the roller dispenser 912 to rotate. As a result, a new, unused segment of seat paper is pulled out from the seat paper cartridge 93 in replacement of the used seat paper, preventing the user's skin from directly making contact with the toilet seat 92. Thus, hygienic use of the toilet seat sanitation paper dispenser 9 is achieved.

Disadvantageously, the toilet seat sanitation paper dispenser 9 allows the user to operate the lever 941 in only one predetermined direction. Since people using the toilet seat sanitation paper dispenser 9 may be right handed or left handed, it is not going to be convenient for every user to operate the lever 941 in the predetermined direction. Thus, different users may experience different efficiency in operating the toilet seat sanitation paper dispenser 9. Specifically, when the toilet seat sanitation paper dispenser 9 is installed on a toilet that is positioned against the wall, there is insufficient room to push the lever 941 backwards. As a result, the toilet seat sanitation paper dispenser 9 cannot be used on such a toilet. Since the use of the toilet seat sanitation paper dispenser 9 is limited by the surrounding structure, the toilet seat sanitation paper dispenser 9 has a limited use.

SUMMARY OF THE INVENTION

It is therefore the objective of this invention to provide a transmission module of a toilet seat sanitation paper dispenser that allows a user to decide which direction the handle of the dispenser should be rotated when operating the dispenser. As such, the toilet seat sanitation paper dispenser can be applied to various kinds of toilets.

In a preferred embodiment, a transmission module of a toilet seat sanitation paper dispenser comprises a housing, a gear assembly and a lever assembly. The housing has a plurality of sets of positioning holes, a set of first central holes and a set of second central holes. The gear assembly has a front gear, an intermediate gear unit and a rear gear unit. The front gear and the rear gear unit are coupled to the plurality of sets of positioning holes. The intermediate gear unit is capable of being optionally coupled with the set of first or second central holes. The front gear is engaged with the intermediate gear unit, and the intermediate gear unit is engaged with the rear gear unit. The lever assembly is connected to the front gear to drive the front gear to rotate.

In a preferred form shown, the rear gear unit comprises a diversion gear and a passive gear, and the intermediate gear unit is engaged with the diversion gear or the passive gear.

In the preferred form shown, a single-direction bearing is arranged at a center of the front gear, a shaft is received in the single-direction bearing, and the shaft extends out of the housing to connect to the lever assembly.

In the preferred form shown, the lever assembly comprises a handle having an inner periphery forming a shaft-coupling hole through which the shaft of the front gear extends.

In the preferred form shown, the handle comprises a first groove and a second groove formed on the inner periphery of the handle, and the lever assembly further comprises a bar inserted into the first groove or the second groove.

In the preferred form shown, the lever assembly further comprises a position-restoring unit having a position-restoring element and a fixing seat. The fixing seat comprises a shaft hole, a first notch and a second notch. The shaft and the bar extend through the shaft hole. The position-restoring element comprises a first end and a second end. The first end of the position-restoring element is affixed to a lateral face of the housing, and the second end of the position-restoring element is fastened in the first notch or the second notch.

In the preferred form shown, the intermediate gear unit comprises a first gear and a second gear coaxial with the first gear. The first gear is engaged with the front gear, and the second gear is engaged with the diversion gear or the passive gear.

In the preferred form shown, the first gear and the second gear are formed in an integral manner.

In the preferred form shown, the front gear has a larger pitch diameter than the first gear, and both the diversion gear and the passive gear have a smaller pitch diameter than the second gear.

In the preferred form shown, the first gear has a smaller pitch diameter than the second gear.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
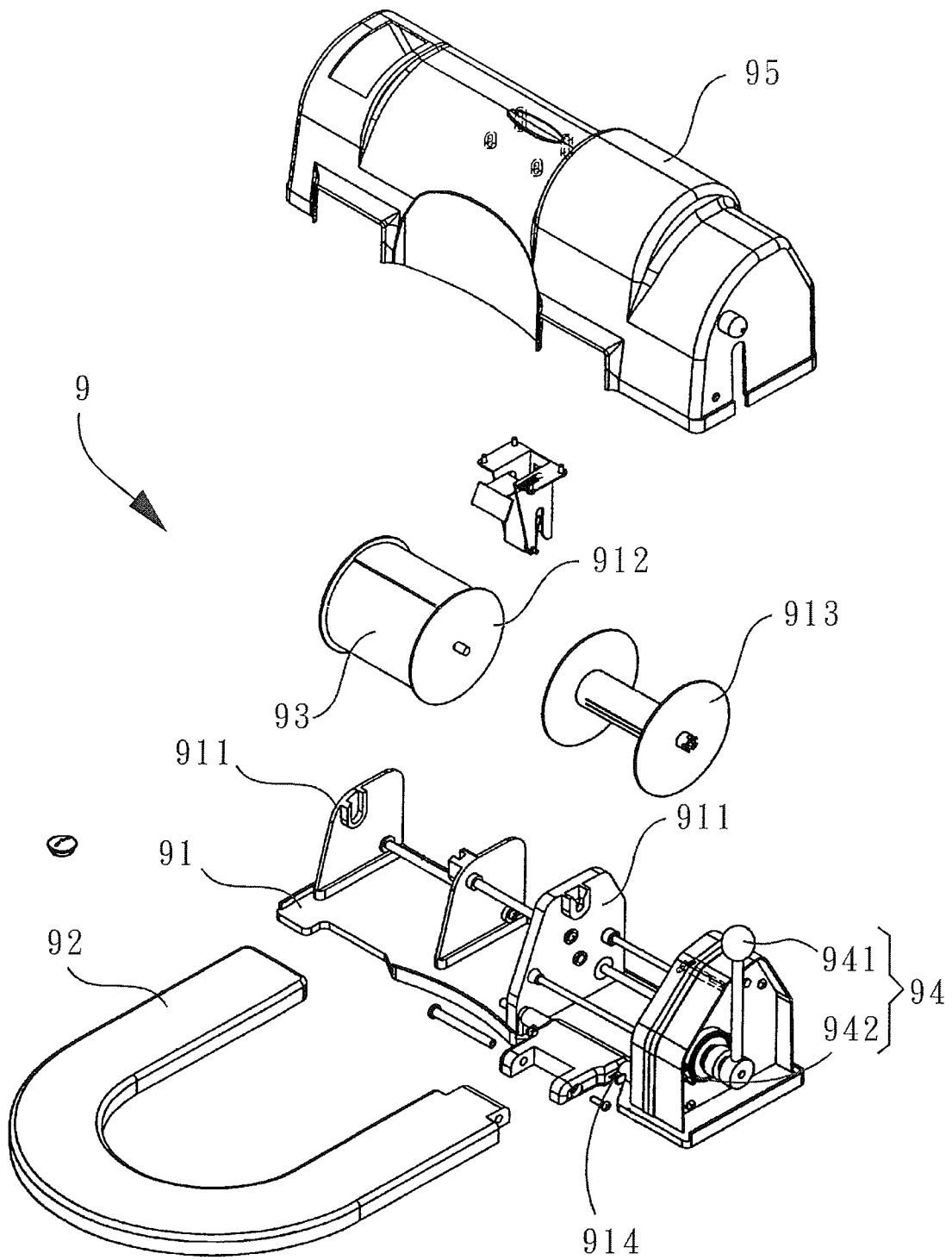
FIG. 1 is an exploded view of a conventional toilet seat sanitation paper dispenser.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
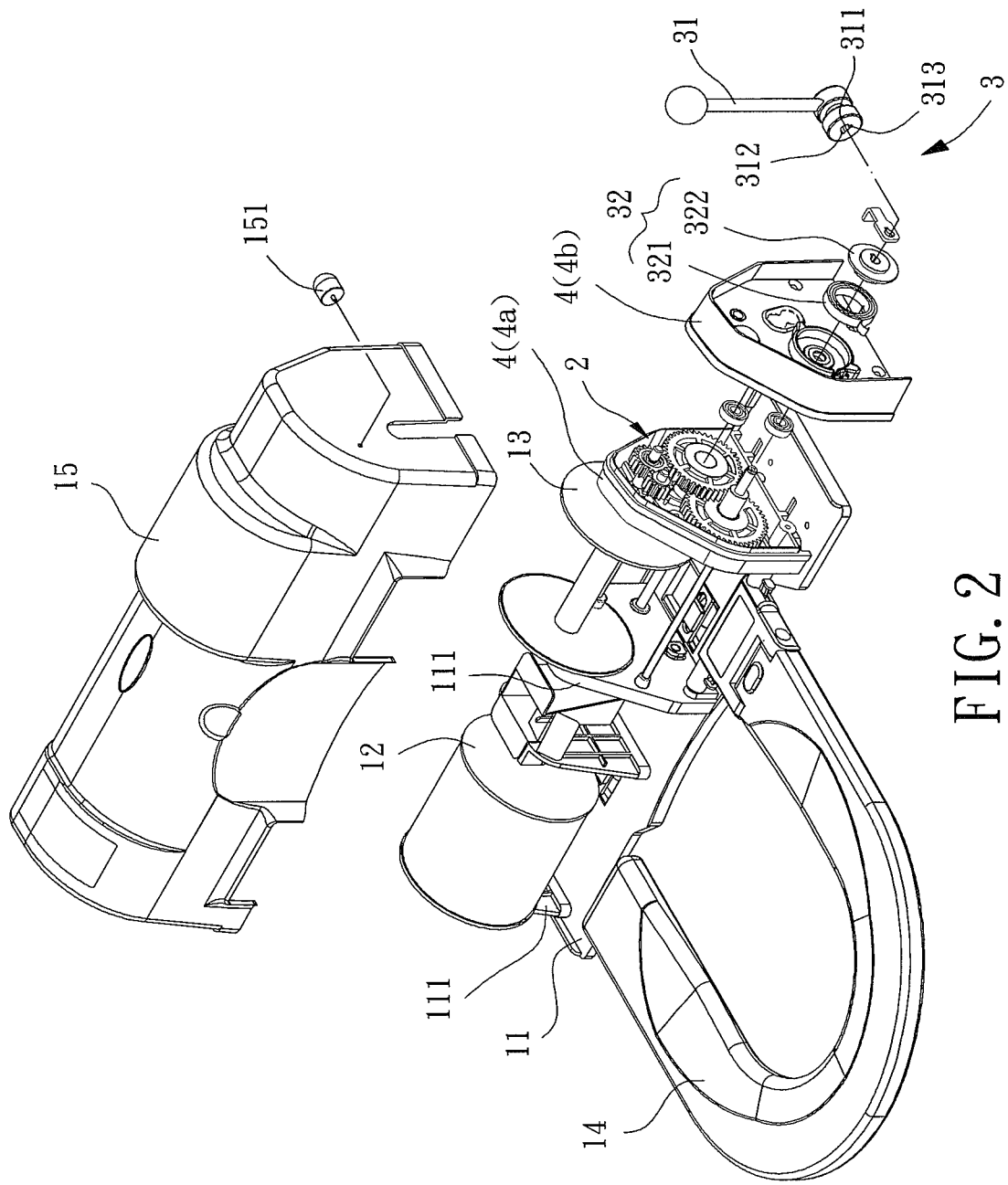
FIG. 2 is an exploded view of a toilet seat sanitation paper dispenser according to a preferred embodiment of the invention.

FIG. 2 shows a toilet seat sanitation paper dispenser having a transmission module according to a preferred embodiment of the invention. Although the transmission module according to the invention is shown to be included in the toilet seat sanitation paper dispenser shown in FIG. 2, the transmission module can also be used to construct other kinds of toilet seat sanitation paper dispensers. In the embodiment, the toilet seat sanitation paper dispenser includes a base 11, a first roller 12, a second roller 13, a toilet seat 14, a cover 15 and a transmission module. The base 11 includes a plurality of standing plates 111. The first roller 12 and the second roller 13 may be rotatably mounted between the standing plates 111. The toilet seat 14 includes two ends which are connected to one edge of the base 11. The base 11 is covered by the cover 15. A lever stopper 151 is mounted on a lateral face of the cover 15. The transmission module may be installed on the base 11 in a position aligned with an outer edge of the toilet seat 14 and adjacent to the second roller 13.

Figure 3:
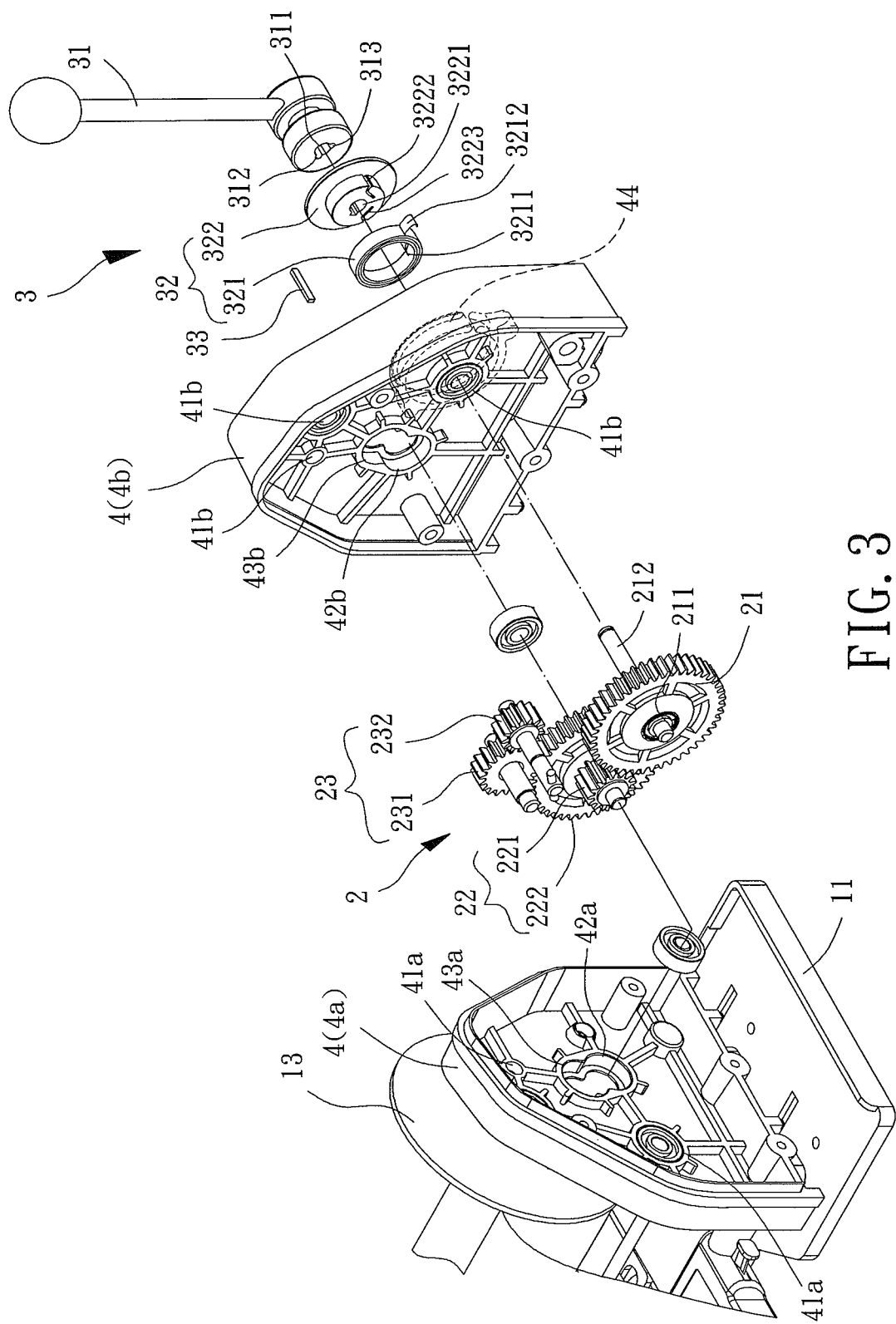
FIG. 3 is a partial, enlarged exploded view of the toilet seat sanitation paper dispenser of the preferred embodiment of the invention.

Referring to FIG. 3, the transmission module may include a gear assembly 2, a lever assembly 3 and a housing 4. The gear assembly 2 may be installed in the housing 4 and connected to the lever assembly 3 and the second roller 13. When operating the lever assembly 3, the gear assembly 2 may drive the second roller 13 to rotate. A user may change the operational direction of the lever assembly 3 (counterclockwise or clockwise direction) by affixing the gear assembly 2 to different parts of the housing 4. In this structure, the second roller 13 can be driven to rotate, collecting the used seat paper from the toilet seat 14 (not shown).

Referring to FIG. 3, the gear assembly 2 includes a front gear 21, an intermediate gear unit 22 and a rear gear unit 23. The front gear 21 is engaged with the intermediate gear unit 22. The intermediate gear unit 22 is engaged with the rear gear unit 23. In the embodiment, a single-direction bearing 211 may be arranged at the center of the front gear 21. A shaft 212 may be received in the single-direction bearing 211. The intermediate gear unit 22 may include a first gear 221 and a second gear 222 coaxial with the first gear 221. The rear gear unit 23 may include a diversion gear 231 and a passive gear 232. The first gear 221 of the intermediate gear unit 22 is engaged with the front gear 21. The diversion gear 231 or the passive gear 232 of the rear gear unit 23 may be engaged with the second gear 222 of the intermediate gear unit 22, depending on requirements. The first gear 221 has a different pitch diameter from the front gear 21. The second gear 222 has a different pitch diameter from the diversion gear 231 or the passive gear 232. In the embodiment, the first gear 221 has a smaller pitch diameter than the second gear 222. The front gear 21 has a larger pitch diameter than the first gear 221. Both the diversion gear 231 and the passive gear 232 have a smaller pitch diameter than the second gear 222. The intermediate gear unit 22 is able to deliver the rotational power of the front gear 21 to the rear gear unit 23 and increases the rotational speed of the rear gear unit 23 based on the differences in the pitch diameter between the first gear 221 and the front gear 21 as well as between the second gear 222 and the rear gear unit 23. The first gear 221 and the second gear 222 are preferably formed in an integral manner to reduce the costs and to improve the efficiency in the production of the intermediate gear unit 22.

Figure 4:
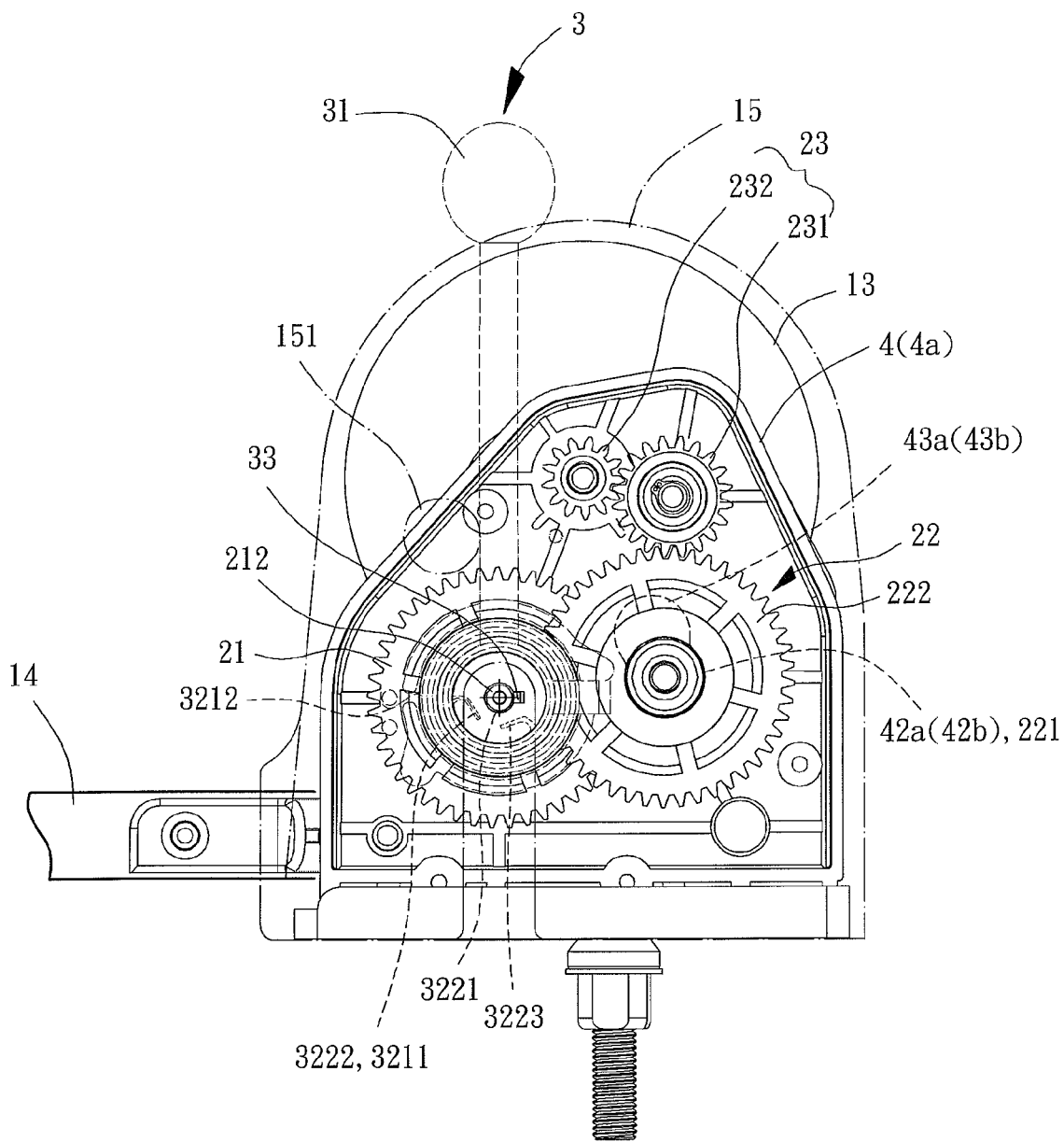
FIG. 4 is a cross-sectional view of the toilet seat sanitation paper dispenser according to a first example of use of the apparatus.

Referring to FIGS. 3 and 4, the lever assembly 3 further includes a handle 31 and a position-restoring unit 32. A user can grip and operate the handle 31. The handle 31 has an inner periphery forming a shaft-coupling hole 311 through which the shaft 212 of the front gear 21 extends. The shaft 212 does not rotate relatively to the handle 31 when coupled with the handle 31. As an example, at least one groove extending along an axial direction of the shaft 212 can be arranged on an outer circumferential face of the shaft 212, and at least one protrusion corresponding to the at least one groove can be arranged on the inner periphery of the handle 31. The protrusion and the groove can be fastened with each other when the shaft 212 extends through the shaft-coupling hole 311, allowing the shaft 212 to synchronously rotate with the handle 31. Alternatively, as shown in FIGS. 2 and 3, the handle 31 has a first groove 312 and a second groove 313 formed on the inner periphery of the handle 31. The lever assembly 3 further includes a bar 33 that can be inserted into the first groove 312 or the second groove 313 to ensure that the shaft 212 will not rotate relatively to the handle 31.

The shaft 212 extends through the position-restoring unit 32. The position-restoring unit 32 will also not rotate relatively to the shaft 212. In the embodiment, the position-restoring unit 32 may be installed between the front gear 21 and the handle 31 when the shaft 212 and the bar 33 extend through the position-restoring unit 32. The position-restoring unit 32 is provided to restore the handle 31 to its original position when the user releases the handle 31. The position-restoring unit 32 may include a position-restoring element 321 and a fixing seat 322. The position-restoring element 321 may be a spiral spring. The fixing seat 322 has a shaft hole 3221, a first notch 3222 and a second notch 3223. The shaft 212 and the bar 33 may extend through the shaft hole 3221. The position-restoring element 321 has a first end 3211 and a second end 3212. The first end 3211 of the position-restoring element 321 may be affixed to a lateral face of the housing 4. The second end 3212 of the position-restoring element 321 may be secured to the first notch 3222 or the second notch 3223. In this regard, when the handle 31 is operated by a user, the fixing seat 322 will cause the position-restoring element 321 to stretch. When the user releases the handle 31, the position-restoring element 321 will restore the handle 31 to its original position.

Referring to FIG. 3, the housing 4 may be arranged on the base 11 in the position aligned with the outer edge of the toilet seat 14 and adjacent to the second roller 13. The housing 4 has an inner space for accommodation of the gear assembly 2. In the embodiment, the housing 4 may consist of a first housing part 4a and a second housing part 4b that can be affixed to each other. The second housing part 4b adjoins the lever assembly 3.

The first housing part 4a includes a plurality of positioning holes 41a, a first central hole 42a and a second central hole 43a. The second housing part 4b also includes a plurality of positioning holes 41b corresponding to the plurality of positioning holes 41a of the first housing part 4a, a first central hole 42b corresponding to the first central hole 42a of the first housing part 4a, as well as a second central hole 43b corresponding to the second central hole 43a of the first housing part 4a. Two corresponding positioning holes 41a and 41b form a set of positioning holes for the housing 4. Thus, the housing 4 has a plurality of sets of positioning holes. In addition, the two corresponding first central holes 42a and 42b form a set of first central holes for the housing 4, and the two corresponding second central holes 43a and 43b form a set of second central holes for the housing 4. Each of the positioning holes 41a and 41b may receive a bearing (not shown). Both first central holes 42a and 42b may also receive a bearing (not shown). Similarly, both second central holes 43a and 43b may also receive a bearing (not shown). Two bearings that are received in two corresponding positioning holes 41a and 41b face each other. Two bearings that are received in the two first central holes 42a and 42b also face each other. Two bearings that are received in the two second central holes 43a and 43b also face each other. In this structure, the front gear 21, the diversion gear 231 and the passive gear 232 of the gear assembly 2 may be coupled with these bearings. In addition, the bearings corresponding to the diversion gear 231 and the passive gear 232 may be coupled to the shafts of the diversion gear 231 and the passive gear 232.

The set of the first central holes 42a and 42b is provided to receive a shaft of the intermediate gear unit 22 of the gear assembly 2. Similarly, the set of the second central holes 43a and 43b is provided to receive the same. In other words, the shaft of the intermediate gear unit 22 can be received in either set of the first or second central holes. When the shaft of the intermediate gear unit 22 is received in the set of the first central holes 42a and 42b, the second gear 222 of the intermediate gear unit 22 can be engaged with the diversion gear 231 of the rear gear unit 23. In another case scenario, when the shaft of the intermediate gear unit 22 is received in the set of the second central holes 43a and 43b, the second gear 222 of the intermediate gear unit 22 can be engaged with the passive gear 232 of the rear gear unit 23. Furthermore, when the distance between the centers of the first central hole 42a and the second central hole 43a (or between the centers of the first central hole 42b and the second central hole 43b) is smaller than a predetermined value, the first central hole 42a and the second central hole 43a (or the first central hole 42b and the second central hole 43b) may partially overlap. At this time, the first central hole 42a and the second central hole 43a (or the first central hole 42b and the second central hole 43b) resemble the shape of "8" as shown in FIG. 3. However, the shape of the first central hole 42a and the second central hole 43a is not limited to what is shown in FIG. 3.

Moreover, one face of the second housing part 4b that faces the lever assembly 3 may have a recess 44 that is coaxial with one of the positioning holes 41b of the second housing part 4b. The position-restoring unit 32 of the lever assembly 3 may be received in the recess 44 while the first end 3211 of the position-restoring element 321 is engaged in the recess 44.

In this structure, when the toilet seat sanitation paper dispenser is installed on a toilet, the user is able to decide the operational direction of the handle 31 based on the personal preference or the positioning of the toilet in regard to surrounding walls. As a first example of use below, the handle 31 is operated in a clockwise direction. As a second example of use below, the handle 31 is operated in a counterclockwise direction. The two examples will be described with accompanying drawings.

Referring to FIGS. 3 and 4, in the first example of use, each of the front gear 21, the diversion gear 231 and the passive gear 232 is coupled with a corresponding positioning hole 41a, 41b to allow the handle 31 to be operated in the clockwise direction. The intermediate gear unit 22 is coupled with the first central hole 42a, so that the second gear 222 of the intermediate gear unit 22 can be engaged with the diversion gear 231 of the rear gear unit 23. Furthermore, the bar 33 may be inserted in the first groove 312 of the handle 31, the second end 3212 of the position-restoring element 321 may be secured to the first notch 3222, and the handle 31 may be positioned on the right side of the lever stopper 151 of the cover 15, thereby allowing the handle 31 to be operated in only the clockwise direction.

Figure 5:
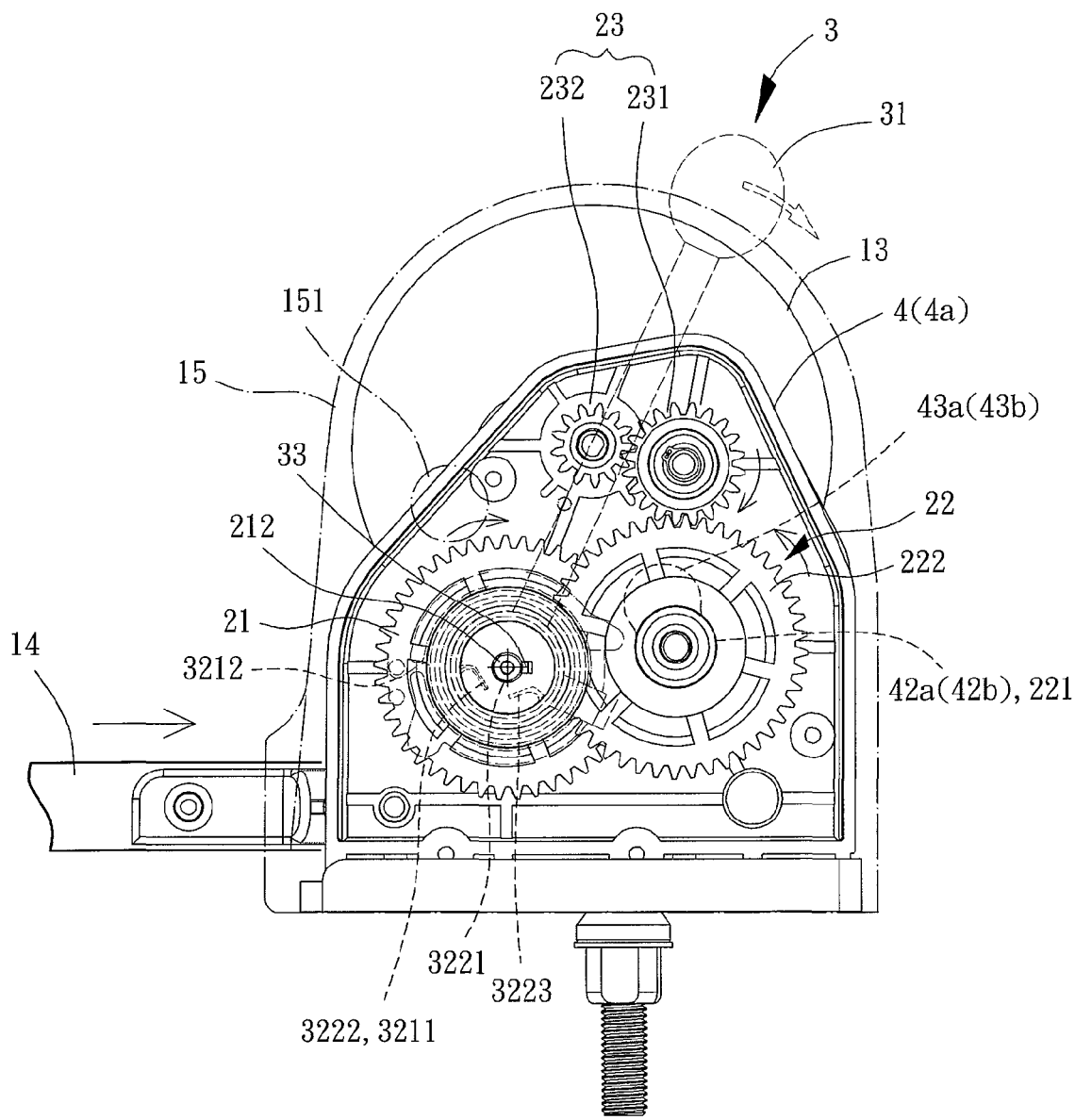
FIG. 5 is the cross-sectional view of the toilet seat sanitation paper dispenser shown in FIG. 4 with a handle being operated in a clockwise direction.
Figure 6:
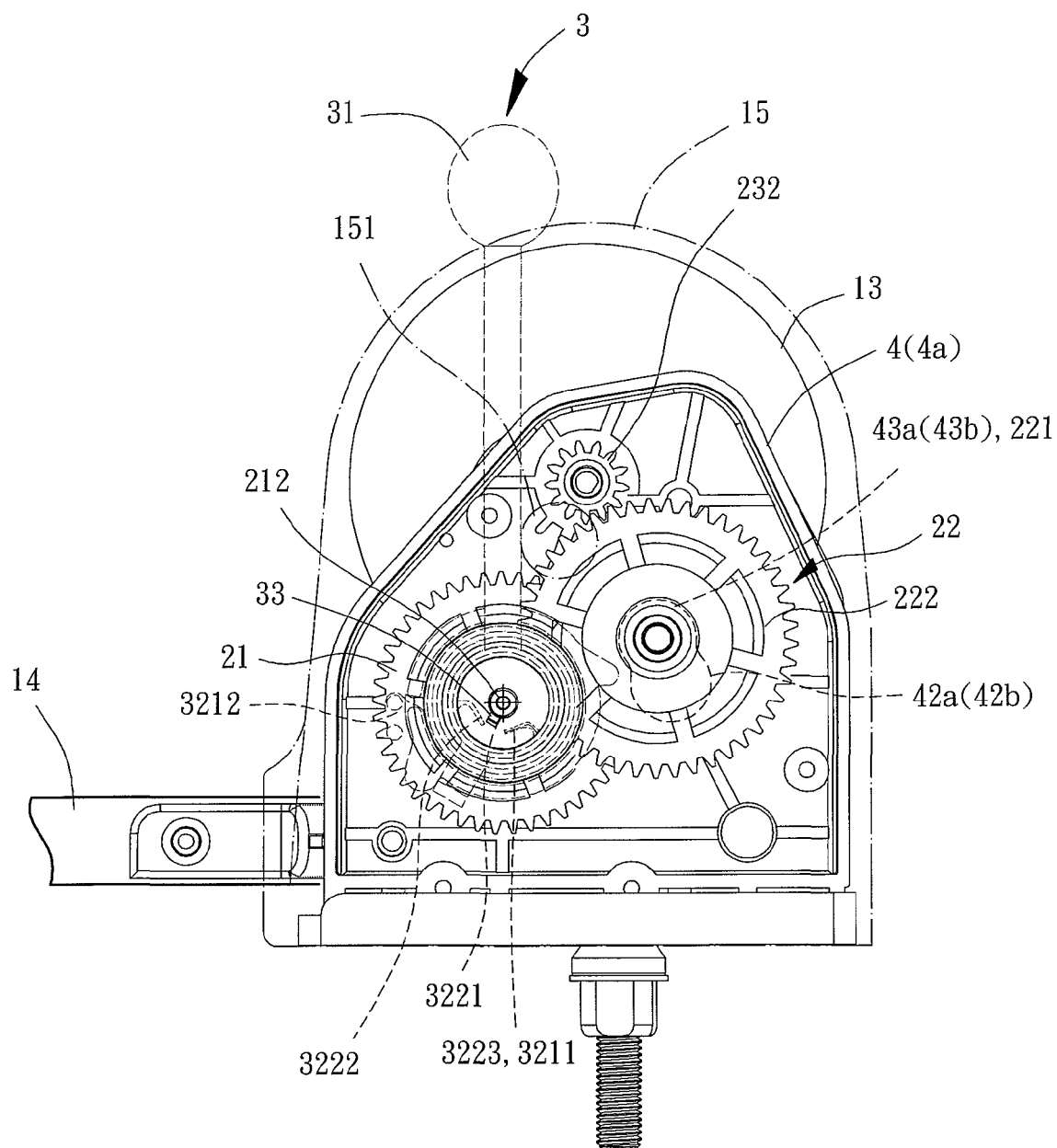
FIG. 6 is a cross-sectional view of the toilet seat sanitation paper dispenser according to a second example of use of the apparatus.

Referring to FIG. 5, when the user operates the handle 31 in the clockwise direction, the handle 31 may drive the shaft 212 to rotate in the clockwise direction under the engagement of the bar 33. At this time, the shaft 212 and the single-direction bearing 211 will not rotate relatively to each other. Therefore, the shaft 212 is able to drive the front gear 21 to rotate, delivering the rotational power to the first gear 221 of the intermediate gear unit 22. Meanwhile, the second gear 222 of the intermediate gear unit 22 is driven in the counterclockwise direction to deliver the rotational power to the diversion gear 231 and the passive gear 232. As such, the passive gear 232 will rotate in the counterclockwise direction, driving the second roller 13 to rotate for collection of the used seat paper. During the operation, the position-restoring element 321 may be stretched when the handle 31 is operated in the clockwise direction. When the user releases the handle 31, the position-restoring element 321 will drive the shaft 212 to rotate in the counterclockwise direction under the elastic force of the position-restoring element 321. As a result, the handle 31 will be pulled back to its original position. Referring to FIGS. 3 and 6, in the second example of use, each of the front gear 21 and the diversion gear 231 is coupled with the two corresponding positioning holes 41a and 41b to allow the handle 31 to be operated in the counterclockwise direction. The diversion gear 231 is omitted in this example. The intermediate gear unit 22 is coupled with the two second central holes 43a and 43b, so that the second gear 222 of the intermediate gear unit 22 can be engaged with the passive gear 232 of the rear gear unit 23. Furthermore, the bar 33 may be inserted in the second groove 313 of the handle 31, the second end 3212 of the position-restoring element 321 may be fastened in the second notch 3223, and the handle 31 may be positioned on the left side of the lever stopper 151 of the cover 15, thereby allowing the handle 31 to be operated in only the counterclockwise direction.

Figure 7:
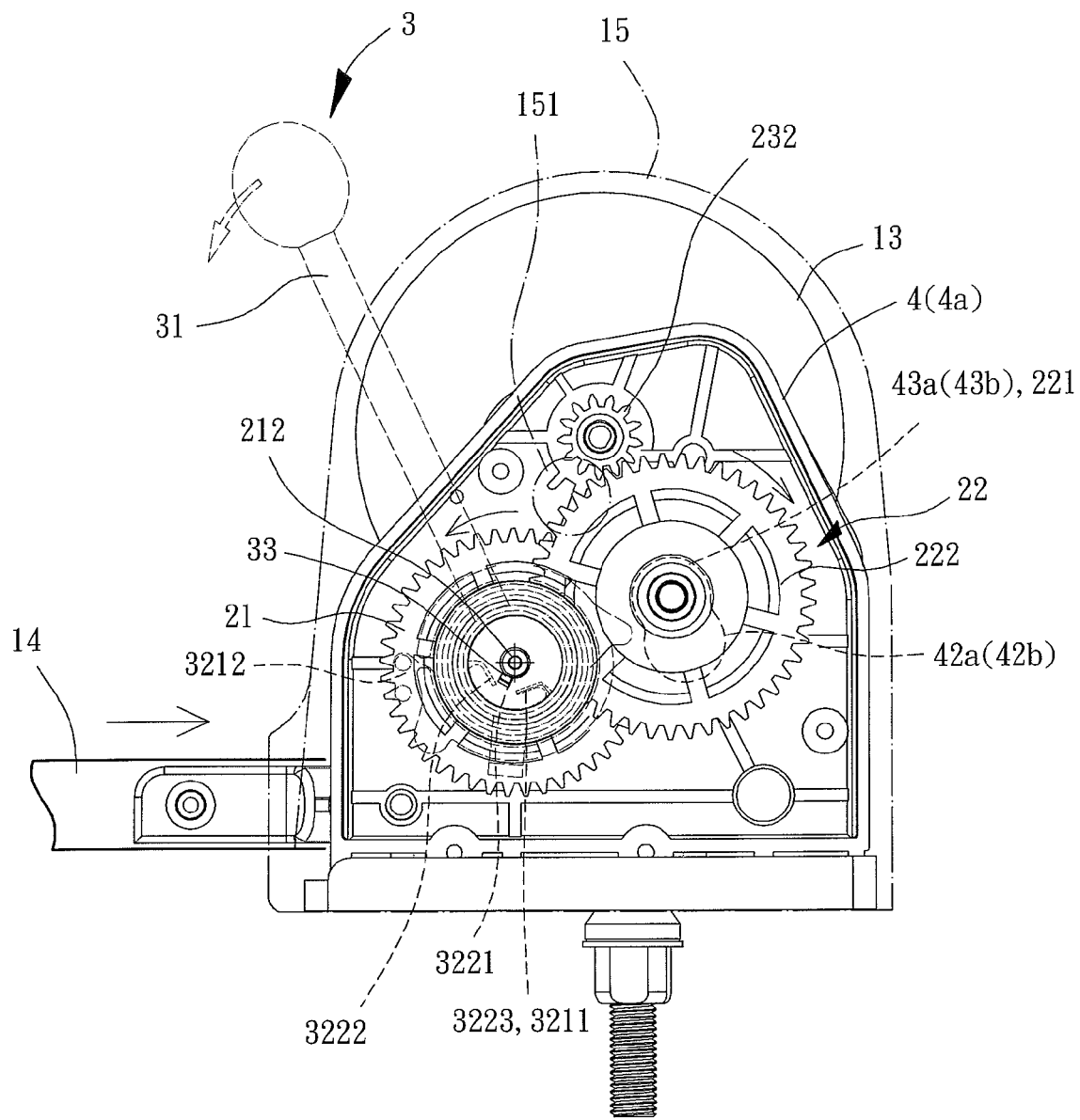
FIG. 7 is the cross-sectional view of the toilet seat sanitation paper dispenser shown in FIG. 6 with a handle being operated in a counterclockwise direction.

Referring to FIG. 7, when the user operates the handle 31 in the counterclockwise direction, the handle 31 may drive the shaft 212 to rotate in the counterclockwise direction under the engagement of the bar 33. At this time, the shaft 212 and the single-direction bearing 211 will not rotate relatively to each other. Therefore, the shaft 212 is able to drive the front gear 21 to rotate, delivering the rotational power to the first gear 221 of the intermediate gear unit 22. Meanwhile, the second gear 222 of the intermediate gear unit 22 is driven in the clockwise direction to deliver the rotational power to the passive gear 232. As such, the passive gear 232 will rotate in the counterclockwise direction, driving the second roller 13 to rotate for collection of the used seat paper. During the operation, the position-restoring element 321 may be stretched when the handle 31 is operated in the counterclockwise direction. When the user releases the handle 31, the position-restoring element 321 will drive the shaft 212 to rotate in the clockwise direction under the elastic force of the position-restoring element 321. As a result, the handle 31 will be pulled back to its original position.

It is noted that, if the shaft 212 rotates in the counterclockwise direction when the handle 31 is operated in the clockwise direction, the shaft 212 should rotate relatively to the single-direction bearing 211. In this regard, the shaft 212 will rotate on its own without driving the front gear 21 to rotate. Similarly, if the shaft 212 rotates in the clockwise direction when the handle 31 is operated in the counterclockwise direction, it should allow the shaft 212 to rotate relatively to the single-direction bearing 211.

In conclusion, when the toilet seat sanitation paper dispenser is installed on a toilet, the apparatus allows the user to decide the operational direction of the handle based on the personal preference or the positioning of the toilet in regard to the surrounding structures. Thus, the dispenser can be applied to various toilets and therefore has an improved utility.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A transmission module of a toilet seat sanitation paper dispenser, comprising:
    a housing having a first housing part and a second housing part, wherein the first housing part comprises a plurality of positioning holes, a first central hole and a second central hole, wherein the second housing part comprises a plurality of positioning holes corresponding to the plurality of positioning holes of the first housing part, a first central hole corresponding to the first central hole of the first housing part, and a second central hole corresponding to the second central hole of the first housing part;
    a gear assembly having a front gear, an intermediate gear unit and a rear gear unit, wherein the front gear and the rear gear unit are coupled to the plurality of positioning holes of the first housing part and the plurality of positioning holes of the second housing part, wherein the intermediate gear unit is coupled with one of the first or second central holes in both of the first and second housing parts, wherein the front gear is engaged with the intermediate gear unit, and wherein the intermediate gear unit is engaged with the rear gear unit;
    a single-direction bearing arranged at a center of the front gear;
    a shaft received in the single-direction bearing; and
    a lever assembly connected to the front gear to drive the front gear to rotate, wherein the shaft extends out of the housing and connects to the lever assembly, wherein the lever assembly comprises a handle having an inner periphery forming a shaft-coupling hole through which the shaft extends, wherein the handle comprises a first groove and a second groove formed on the inner periphery of the handle, wherein the lever assembly further comprises a bar inserted into the first groove or the second groove, wherein the lever assembly further comprises a position-restoring unit having a position-restoring element and a fixing seat, wherein the fixing seat comprises a shaft hole, a first notch and a second notch, wherein the shaft and the bar extend through the shaft hole, wherein the position-restoring element comprises a first end and a second end, wherein the first end of the position-restoring element is affixed to a lateral face of the housing, and wherein the second end of the position-restoring element is fastened in the first notch or the second notch.

2. The transmission module of a toilet seat sanitation paper dispenser as claimed in claim 1, wherein the rear gear unit comprises a diversion gear and a passive gear, and wherein the intermediate gear unit is engaged with the diversion gear or the passive gear.

3. The transmission module of a toilet seat sanitation paper dispenser as claimed in claim 1, wherein the intermediate gear unit comprises a first gear and a second gear coaxial with the first gear, wherein the first gear is engaged with the front gear, and wherein the second gear is engaged with the diversion gear or the passive gear.

4. The transmission module of a toilet seat sanitation paper dispenser as claimed in claim 3, wherein the first gear and the second gear are formed in an integral manner.

5. The transmission module of a toilet seat sanitation paper dispenser as claimed in claim 3, wherein the front gear has a larger pitch diameter than the first gear, and wherein both the diversion gear and the passive gear have a smaller pitch diameter than the second gear.

6. The transmission module of a toilet seat sanitation paper dispenser as claimed in claim 5, wherein the first gear has a smaller pitch diameter than the second gear.

* * * * *